United States Patent
Roehnert et al.

(10) Patent No.: US 10,753,537 B2
(45) Date of Patent: Aug. 25, 2020

(54) PROTECTIVE COVER HAVING A SUPPORT FRAME WHICH CAN BE SNAPPED IN

(71) Applicant: ARNO ARNOLD GMBH, Obertshausen (DE)

(72) Inventors: Maximilian Roehnert, Friedrichsdorf (DE); Wolf-Matthias Mang, Obertshausen (DE)

(73) Assignee: ARNO ARNOLD GMBH, Obertshausen (DE)

( * ) Notice: Subject to any disclaimer, the term of this patent is extended or adjusted under 35 U.S.C. 154(b) by 0 days.

(21) Appl. No.: 16/310,211

(22) PCT Filed: Jul. 15, 2016

(86) PCT No.: PCT/EP2016/066906
§ 371 (c)(1),
(2) Date: Dec. 14, 2018

(87) PCT Pub. No.: WO2018/010813
PCT Pub. Date: Jan. 18, 2018

(65) Prior Publication Data
US 2019/0186692 A1    Jun. 20, 2019

(51) Int. Cl.
*F16P 1/02*    (2006.01)
*B23Q 11/08*    (2006.01)

(52) U.S. Cl.
CPC ............ *F16P 1/02* (2013.01); *B23Q 11/0816* (2013.01)

(58) Field of Classification Search
CPC ................................ F16P 1/02; B23Q 11/0816
See application file for complete search history.

(56) References Cited

U.S. PATENT DOCUMENTS

| 4,638,722 A * | 1/1987 | Schneider | B23Q 11/0816 92/34 |
| 2007/0230836 A1 * | 10/2007 | Schirling | B23Q 11/0816 384/15 |

(Continued)

FOREIGN PATENT DOCUMENTS

| CN | 1899759 A | 1/2007 |
| CN | 103260822 A | 8/2013 |

(Continued)

OTHER PUBLICATIONS

PCT English Language Translation of the International Preliminary Report on Patentability, PCT/EP2016/066906, dated Jan. 17, 2019, 5 pages.

(Continued)

*Primary Examiner* — Vicky A Johnson
(74) *Attorney, Agent, or Firm* — Quarles & Brady LLP (57) ABSTRACT

The invention relates to a protective cover (01) comprising at least one protective cover element (02), which is variable in length, and comprising a frame element (04), said frame element (04) being capable of being connected to the protective cover element (02), said protective cover element (02) comprising at least one holding means (03) and said frame element (04) comprising at least one fastening means (06) in the area of a first longitudinal edge (05*a*), the connection between the holding means (03) and the fastening means (06) being a detachable, in particular force-fitting and/or interlocking, snap connection.

15 Claims, 6 Drawing Sheets

(56) References Cited

U.S. PATENT DOCUMENTS

| | | | |
|---|---|---|---|
| 2013/0186577 A1 | 7/2013 | Mang et al. | |
| 2016/0184949 A1* | 6/2016 | Yagami | F16P 3/02 409/134 |
| 2019/0186692 A1* | 6/2019 | Roehnert | F16P 1/02 |
| 2019/0337108 A1* | 11/2019 | Kreutzer | B23Q 11/08 |

FOREIGN PATENT DOCUMENTS

| | | |
|---|---|---|
| DE | 18 15 402 A1 | 7/1970 |
| DE | 86 17 769 U1 | 8/1986 |
| DE | 89 08 848 U1 | 9/1989 |
| DE | 10 2006 033607 B4 | 9/2008 |
| DE | 20 2012 008987 U1 | 10/2012 |
| JP | 2003290967 A | 10/2003 |
| JP | 3107637 U | 2/2005 |
| JP | 2009137639 A | 6/2009 |
| WO | 2004074736 A1 | 9/2004 |

OTHER PUBLICATIONS

International Search Report and Written Opinion dated Apr. 12, 2017 in connection with PCT/EP2016/066906.
China National Intellectual Property Administration, First Office Action and Search Report, Application No. 201680087684.0, dated Apr. 3, 2020, 15 pages.
Japan Patent Office, Notification of Reasons for Refusal, Application No. P2019-500580, dated Apr. 10, 2020, 20 pages.

* cited by examiner

PROTECTIVE COVER HAVING A SUPPORT FRAME WHICH CAN BE SNAPPED IN

CROSS-REFERENCE TO RELATED APPLICATIONS

This application represents the national stage entry of PCT International Application No. PCT/EP2016/066906 filed Jul. 15, 2016. The contents of this application are hereby incorporated by reference as if set forth in their entirety herein.

The invention relates to a protective cover according to the preamble of claim 1.

From the state of the art, protective covers are already known and serve in particular, albeit not exclusively, for covering movable machine parts or the like. Such protective covers have elements variable in length. In this manner, the machine parts are not only protected from foreign impacts, such as from shavings, dust particles or other contamination, when extended or retracted, but can also be sealed from the environment. DE 10 2006 033 607 B4 and DE 20 2012 008 987 U1 are referenced as examples.

The elements of the protective cover are connected to a support frame which serves for stabilizing, in particular supporting, the same. For this purpose, the support frame generally comprises several frame elements which are dispersed at equal distances to each other across the length of the elements of the protective cover. In protective covers known from the state of the art, such support frames are detachably connected, e.g. by being glued, riveted and/or sewn, to the protective cover elements.

In the protective covers known from the state of the art, however, it has proven to be disadvantageous if the connection between the elements and the support frame is unable to be detached without further ado, in particular when installed. Normally, the elements and the support frame are separated from each other by cumbersomely detaching the adhesive connection, the rivet connection and/or the seam. Thus, understandably, it is absolutely necessary to remove the entire protective cover and exchange it with a new protective cover should the protective cover have been damaged in order to avoid unnecessary standstills of the machine parts to be protected. This is necessary even if a repair of individual areas of the protective cover is possible and sensible. Understandably, such maintenance and complete exchange is immensely expensive and labor-intensive.

Therefore a large demand exists for a protective cover which ensures that the individual components are able to be exchanged, maintained and repaired quickly, reliably and easily. Moreover, the protective cover should be inexpensive in production, have a long service life and be adjustable to the individual area of the machine which is to be protected. The object of the invention is therefore to provide a protective cover to overcome the abovementioned difficulties and in particular to reduce the costs caused by maintenance and/or repairs as well as the standstills of the machine caused thereby.

This object is attained in a surprisingly simple but effective manner by a protective cover according to the teachings of independent claim 1.

According to the invention, a protective cover comprising at least one protective cover element variable in length and comprising at least one frame element is proposed, said frame element being capable of being connected to the protective cover element. In this context, the frame element additionally supports the protective cover element. The protective cover is characterized by the protective cover element comprising at least one holding means, and the frame element is characterized by comprising at least one fastening means in the area of a first longitudinal edge, the connection between the holding means and the fastening means being a detachable, in particular force-fitting and/or interlocking, snap connection.

The protective cover according to the invention is based on the fundamental idea that a snap connection is a detachable and direct connection between at least two components, in particular between the holding means of the protective cover element and the fastening means of the frame element, whose geometries are matched to each other in such a manner that they form a force-fitting and/or interlocking connection which cannot be undone by increased use of force, by using tools, by movement and/or a combination thereof. This means that the geometries of the holding means and the fastening means are matched to each other such that they hook or chock with each other in a force-fitting and/or interlocking manner upon becoming connected.

In the context of the invention, it has been discovered that a snap connection ensures a simple, quick, sturdy and durable connection between the protective cover element and the frame element which in turn requires no additional securing means, such as screws and/or clamps and/or the like. For this purpose, the snap connection can be detached again.

In this manner, the snap connection enables a simple, quick and effortless installation and removal by the protective cover element being able to be connected to or being able to be removed from the frame element, e.g. by inserting one into the other or by sliding one out of the other, solely by directly contacting the fastening means to the holding means. In the event of having to maintain and/or repair the protective cover, this enables having to separate and to thus exchange and/or overhaul only the parts of the protective cover affected by the maintenance and/or repair. A time-consuming and cost-intensive removal and/or replacement of the entire protective cover can thus be precluded.

Consequently, not only the work and/or material costs can be reduced but also the standstills of the machine caused by downtime as well as repair time can be kept low so that costs can be significantly reduced.

Advantageous embodiments of the invention, which can be realized individually or in combination with each other, are disclosed in the dependent claims.

It is conceivable in one embodiment of the present invention for the holding means to be an oblong opening and for the fastening means to be in the shape of a T having a crosspiece and two projecting T-legs. In order to realize a reliable and sturdy connection between the protective cover element and the frame element, it is important that the geometry of the opening coincides with the geometry of the fastening means. In addition, it is important that the width of the oblong opening is matched to the width of the fastening means so that the T-shaped fastening means hooks and/or chocks in the opening upon the two being directly contacted. In this context, it is preferred that the width of the oblong opening is larger than the width of the crosspiece but smaller than the width of the fastening means from one T-leg to the other T-leg. In this context, the fastening means can be connected to the holding means by inserting one into the other in a certain position or can be detached from the holding means by sliding one out of the other. For a reliable connection, it is also important for the height of the crosspiece to be at least the same as the thickness of the protective cover element to be held. In this context, the production of a protective cover element having an oblong opening as well as of a frame element having a fastening means is not only very inexpensive but can also be very easily and quickly realized using a variety of materials known from the state of the art. The frame element and the fastening means can be designed in one piece or in multiple pieces, in the case of the multi-piece embodiment being connected detachably, e.g. by being glued, sewn and/or riveted, or permanently, e.g. by being soldered. Within the scope of the invention, the type of connection is of minor importance.

The embodiment of the T-shaped fastening means having the crosspiece and the two projecting T-legs moreover provides the advantage that the connection between the frame element and the protective cover element is load-transmitting. Additionally, the fastening means is very effectively protected from bending so that the connection is not undone even in case of overstraining the protective cover, in particular in case of a lateral displacement and/or overexpansion of the same.

In another advantageous embodiment of the invention, it is conceivable for the protective cover to comprise at least two frame elements and at least one ribbon-shaped or strip-shaped barrier which is fastened to the first longitudinal edges of the frame elements in the area of said first longitudinal edges of the frame elements by essentially overlapping the entire length of the protective cover, the length of the barrier between every two adjacent frame elements being at least slightly smaller than the maximal length of the protective cover element between said frame elements when the protective cover is extended. In this manner, the barrier is directly connected to the protective cover element and the frame elements, for example by the barrier being disposed between the protective cover element and the frame elements in the simplest instance and by being held via the snap connection by means of the fastening means being hooked and/or chocked in the opening. Furthermore, for example, the barrier comprises at least one holding means, in particular an oblong opening. The holding means of the barrier is designed congruent with the holding means of the protective cover element. The fastening means of each frame element then hooks and/or chocks with both holding means at the same time, said holding means of the protective cover element being disposed above the holding means of the barrier. In this regard, it is decisive that the height of the crosspiece is at least the same as the thickness of the protective cover element to be held and of the barrier to be held.

The barrier advantageously limits the maximal length of the protective cover element in the direction of the movement of the machine tool so that the barrier thus prevents the protective cover from extending too far and ensures that the protective cover extends far enough. Thus, the protective cover is protected from overstraining and in particular overexpansion.

In an alternative advantageous embodiment of the invention, it is conceivable for the protective cover to comprise at least two frame elements and at least one ribbon-shaped or strip-shaped barrier essentially overlapping the entire length of the protective cover, said barrier comprising at least one holding means, in particular an oblong opening, and said frame elements each comprising at least one fastening means in the area of second longitudinal edges opposite the first longitudinal edges, said holding means being able to be connected to the fastening means by means of a detachable, in particular force-fitting and/or interlocking, snap connection. Furthermore, the length of the barrier between every two adjacent frame elements is at least slightly smaller than the maximal length of the protective cover element between said frame elements when the protective cover is extended. Thus, the snap connection is a detachable and direct connection between at least two components, in particular between the holding means of the barrier and the fastening means of the frame element. For this purpose, it is important that the geometries of the holding means and the fastening means are matched to each other in such a manner that they connect in a force-fitting and/or interlocking manner upon being directly contacted, in particular that they hook and/or chock with each other, so that the connection cannot be undone by increased use of force, by using tools or by movement and/or a combination thereof. In this manner, the snap connection enables a simple, quick and effortless installation and removal by the barrier being able to be connected to or removed from the frame element solely by directly contacting the fastening means to the holding means, e.g. by inserting one into the other or by sliding one out of the other, respectively. In the event of maintenance and/or repair of the protective cover, this enables that only the parts of the protective cover affected by the maintenance and/or repair have to be separated from each other by undoing the connection and thus can be exchanged and/or overhauled.

It has been discovered in the context of this invention that the barrier therefore is indirectly connected to the protective cover element and directly connected to the frame elements, said holding means of the protective cover element and the barrier preferably being designed congruent with each other for this purpose. It is therefore preferred if the holding means of the protective cover element are able to be connected to the fastening means of the first longitudinal edge of the frame element and the holding means of the barrier are able to be connected to the fastening means of the second longitudinal edge of the same frame element, in particular are able to be hooked and/or chocked in both instances. Furthermore, it is preferred that the fastening means at the second longitudinal edge of the frame element are formed in the shape of a T, having a crosspiece and two projecting T-legs. Even more preferably, the fastening means of the first longitudinal edge and the second longitudinal edge of the frame element are formed congruent with each other.

The barrier advantageously limits the maximal length of the protective cover element in the direction of movement of the machine tool so that the barrier prevents the protective cover from extending too far and ensures a maximal extension length of the protective cover. Thus, the protective cover is protected from overstraining, in particular from overextension.

In a further embodiment, it is conceivable to carry out the connection without using tools so that a quick and effortless installation and/or removal of the protective cover element, the barrier and/or the frame elements can be realized.

According to an embodiment of the invention, it is conceivable for the protective cover to have at least two frame elements which each constitute part of a, in particular metal, protective cover segment, said protective cover segments each engaging behind one another telescopically when the protective cover is being extended. In this regard, it is conceivable for the frame elements to be realized in one piece or in multiple pieces with the protective cover segments, such as telescopic sheets, said frame elements in the instance of a multi-piece embodiment being detachably connected, e.g. by being glued, sewn and/or riveted, or being permanently connected, e.g. by being welded. Within the scope of the invention, the type of connection is of minor importance. The protective cover segments can be connected using a jointed construction or can be rigidly connected to the protective cover under continued pressure by means of special fastening clamps. Preferably, the protective cover segments are made of metal, in particular stainless steel. For this purpose, the protective cover segments form a closed front. In addition, the protective cover segments are formed such that they have a stripping effect, in particular a pronounced stripping effect. This provides the advantage that the protective cover is not only liquid-proof and dust-proof but also keeps out heavy contamination, such as hot and/or sharp-edged shavings. For this reason, the machines and/or their movable parts are reliably protected even from heavy contamination.

In conjunction with the use of a barrier, different advantages arise. In a telescopic protective cover, depending on the embodiment, the possibility exists that not only the protective cover itself becomes damaged but also that the machine and/or its movable parts become damaged when the protective cover is accidentally changed in length excessively. This is the case, for instance, when gaps form between the elements of the protective cover segments owing to an excessive change in length, harmful impacts being able to reach the movable parts of the machine via said gaps. In this instance, it is particularly advantageous if the barrier limits the change in length of the protective cover. Furthermore, telescopic protective covers and/or protective cover segments are very robust and reliable.

It is further conceivable for the protective cover element and/or the barrier to be essentially made of a foldable, in particular textile and/or inherently rigid, plastic material. These materials are suitable on the one hand owing to the extensive manageability of their material properties so that the protective cover element and/or the barrier can be adjusted precisely to the needed requirements of the protective cover. It is thus intended, for example, for the protective cover element and/or the barrier to be made of a firm, resistant textile material or a light foil. Moreover, said materials are readily available, inexpensive and/or easy to process. Additionally, the materials are particularly suitable for being used near and/or at movable parts of machine tools as they have a long service life and are resistant to influences occurring there. For example, a contact with the operating materials of a machine tool, such as lubricants, shavings or the like, does not lead to a deterioration of the material properties and thus to a risk to the functionality and/or to premature material fatigue of the protective cover element and/or of the barrier.

Alternatively, it is conceivable for the plastic material to be a thermoplastic material. A thermoplastic material is a plastic material which can be deformed reversibly within a certain temperature range. In addition, a thermoplastic material can be welded. Preferred thermoplastic materials are, for example, though not exclusively, acrylonitrile-butadiene-styrene (ABS), polyamide (PA), polylactate (PLA), polymethyl methacrylate (PMMA), polycarbonate (PC), polyethylene terephthalate (PET), polyethylene (PE), polypropylene (PP), polystyrene (PS), polyether ether ketone (PEEK), polyvinyl chloride (PVC).

In another preferred embodiment of the invention, it is conceivable for the frame element to be made of an inherently rigid plastic material so that the frame element supports the protective cover element in the best possible manner. Inherently rigid plastic materials are known to the skilled artisan and are particularly suitable for use near and/or at movable parts of machine tools owing to the extensive manageability of their material properties since they have a long service life and are resistant to influences occurring there and, for example, prevent premature material fatigue of the frame elements. Moreover, these materials are readily available, inexpensive and/or easy to process.

In a further embodiment of the invention, it is conceivable for the frame element to connect at least two protective cover elements to each other. This means that the frame element has at least two fastening means which are distanced to each other and can each be connected to the holding means of different protective cover elements. In this manner, larger dimensions of the protective cover become possible. Furthermore, the embodiment enables exchanging individual portions of the protective cover in the event of maintenance and/or repair.

Alternatively, it is also conceivable for the protective cover elements to be disposed at an angled offset to each other in order to form protective covers around corners, for example.

It is presumed that the definitions and explanations of the abovementioned terms apply to all aspects described in the following description, unless otherwise indicated.

Further details, features and advantages of the invention can be derived from the following description of the preferred exemplary embodiments in conjunction with the dependent claims. For this purpose, the respective features can be realized individually or in combination with each other. The invention is not limited to the exemplary embodiments. The exemplary embodiments are schematically illustrated in the figures. The same reference numerals in the individual figures describe the same elements or elements having the same functions or corresponding to each other regarding their function.

In the figures,

FIG. 1 illustrates an isometric view of a protective cover element (FIG. 1A), a frame element (FIG. 1B) and a frame element (FIG. 1C) snapped into the protective cover element;

Figure 1A:
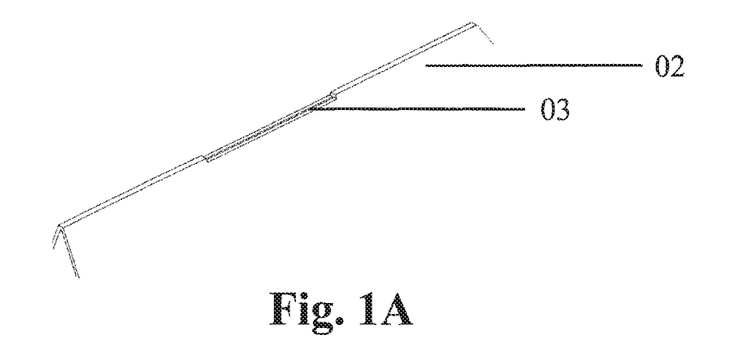
Figure 1B:
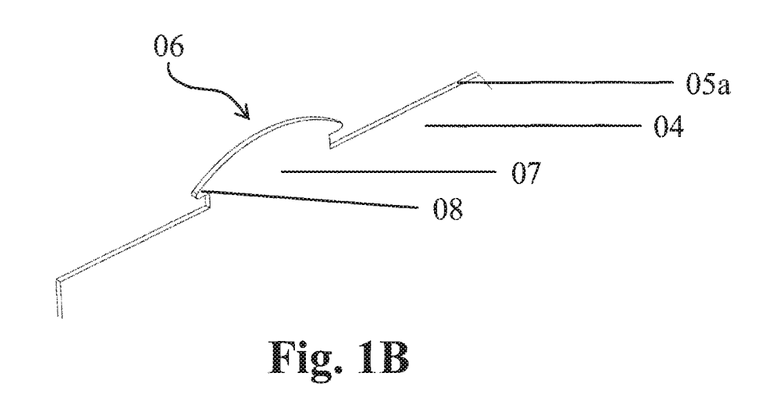
Figure 1C:
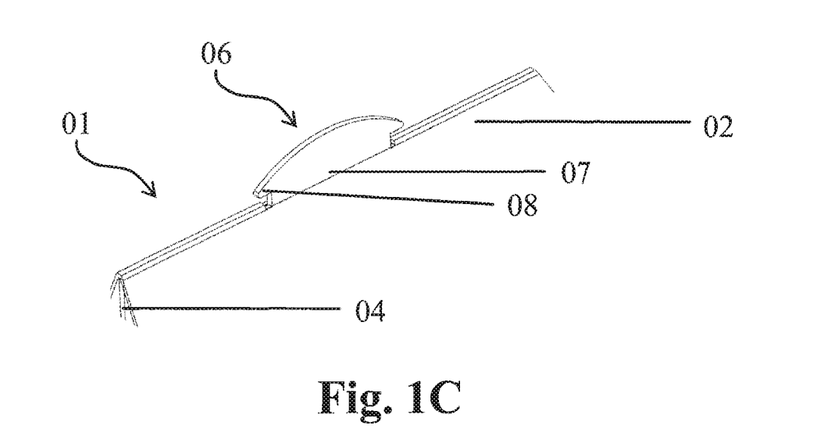

In FIG. 1, isometric views of a protective cover element 02 (FIG. 1A), a frame element 04 (FIG. 1B) and a frame element 04 (FIG. 1C), which is snapped into the protective cover element 02, are illustrated.

In FIG. 1A, a detailed view of the protective cover element 02 is illustrated, said protective cover element comprising a holding means 03 realized as an oblong opening.

In FIG. 1B, a detailed view of the frame element 04 is illustrated, said frame element comprising a fastening means 06 in the area of a first longitudinal edge 05*a*. The fastening means 06 is realized in the shape of a T having a crosspiece 07 and two projecting T-legs 08. Owing to the T-shaped design, the fastening means 06 is effectively protected from bending.

FIG. 1C illustrates a detailed view of the protective cover 01 according to the invention, in which the protective cover element 02 is connected to the frame element 04 by means of a snap connection in which the geometries of the holding means of the protective cover element 02 and of the fastening means 06 of the frame element 04 are matched to each other in such a manner that they connect in a force-fitting and/or interlocking manner, said connection not being able to be undone by increased use of force, by using tools or by movement and/or a combination thereof. The holding means and the fastening means 06 hook and/or chock with each other in such a manner that they connect permanently and sturdily, the connection itself not requiring any additional securing means, such as screws and/or clamps and/or the like.

As can be clearly seen in FIG. 1C, the holding means of the protective cover element 02 is formed as an oblong opening. The fastening means 06 of the frame element 04 is in the shape of a T having a crosspiece 07 and two projecting T-legs 08. In this context, the width of the oblong opening is larger than the width of the crosspiece 07 but smaller than the width of the fastening means 06 of one T-leg to the other T-leg 08. In this manner, a reliable connection is formed.

Figure 2:
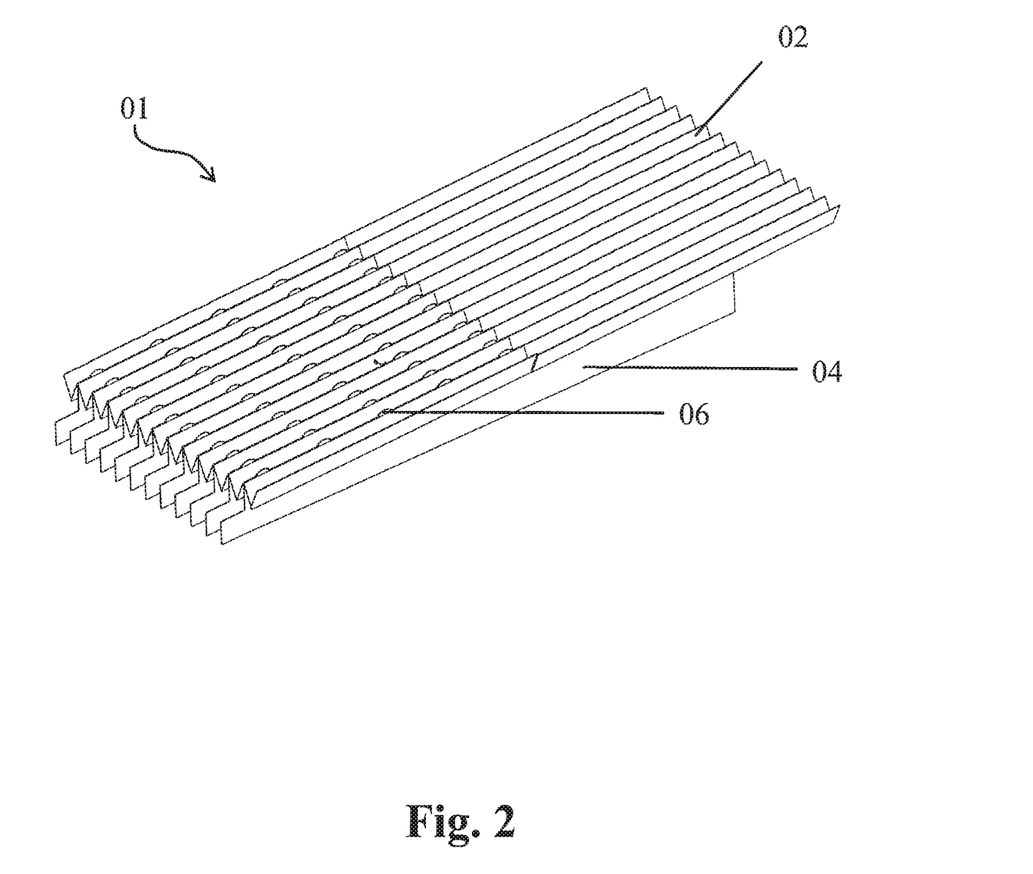
FIG. 2 illustrates an isometric view of a protective cover according to the invention.

In FIG. 2, an isometric view of a protective cover 01, e.g. in the make of a bellows, is illustrated in which frame elements 04 are disposed in each fold of a protective cover element 02 and are connected to said folds by means of directly contacted holding means and fastening means 06 which become hooked upon direct contact in such a manner that the frame elements 04 are reliably and permanently connected to the protective cover element 02. The fastening means 06 of the frame elements 04 can be easily and quickly snapped into the holding means of the protective cover element 02.

Figure 3A:
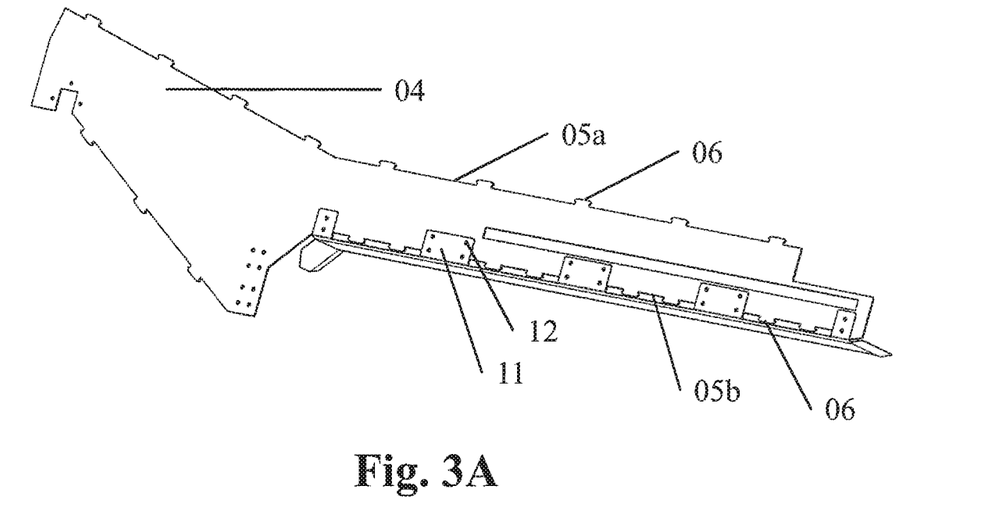
FIG. 3 illustrates an isometric view of a protective cover segment according to the invention.
Figure 3B:
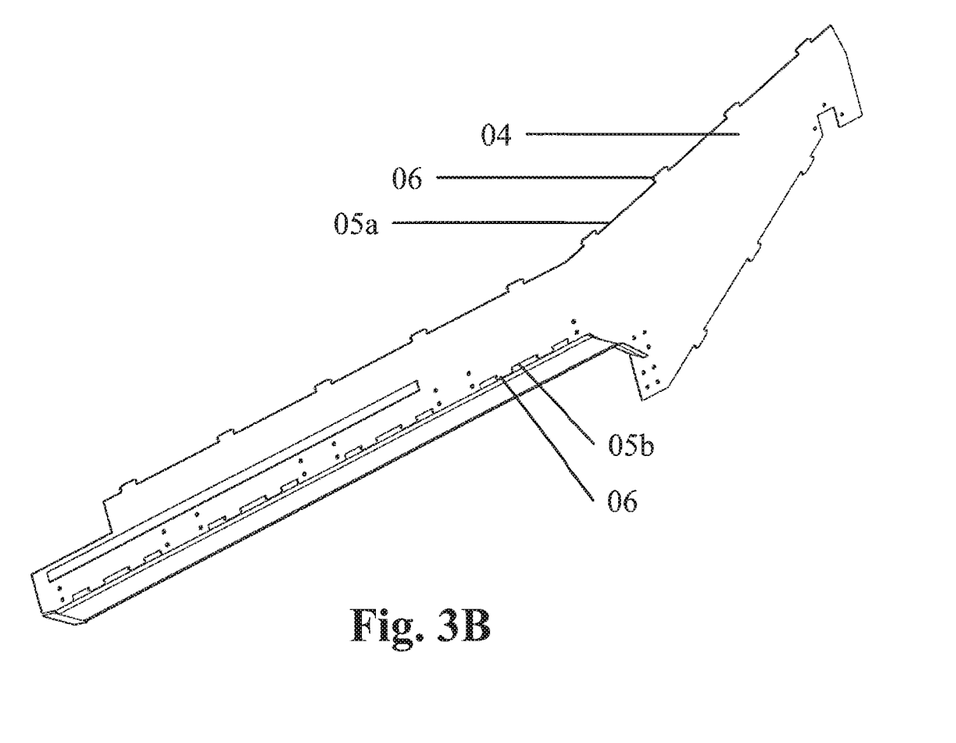
Figure 4A:
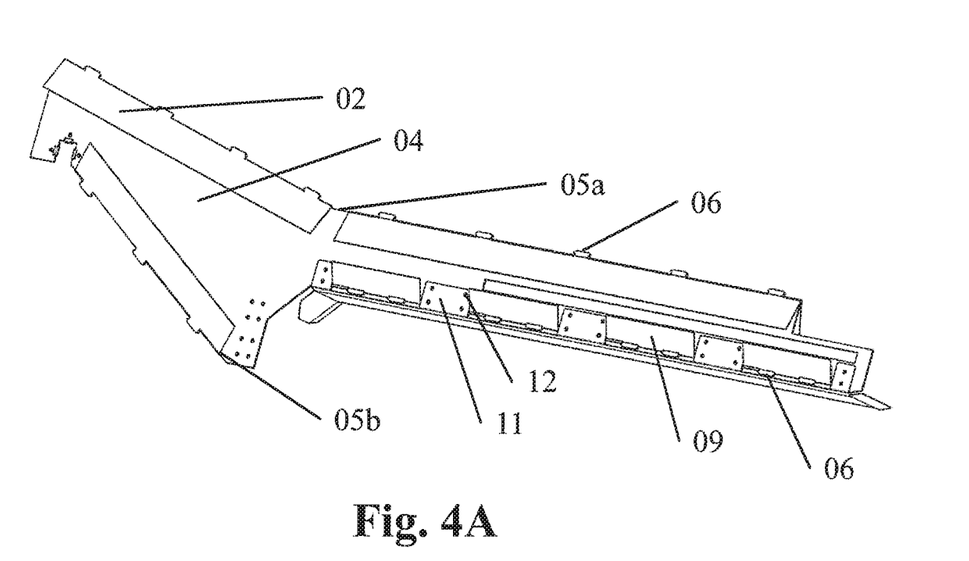
FIG. 4 illustrates an isometric view of a protective cover segment according to the invention having a snapped-in protective cover element and a snapped-in barrier.
Figure 4B:
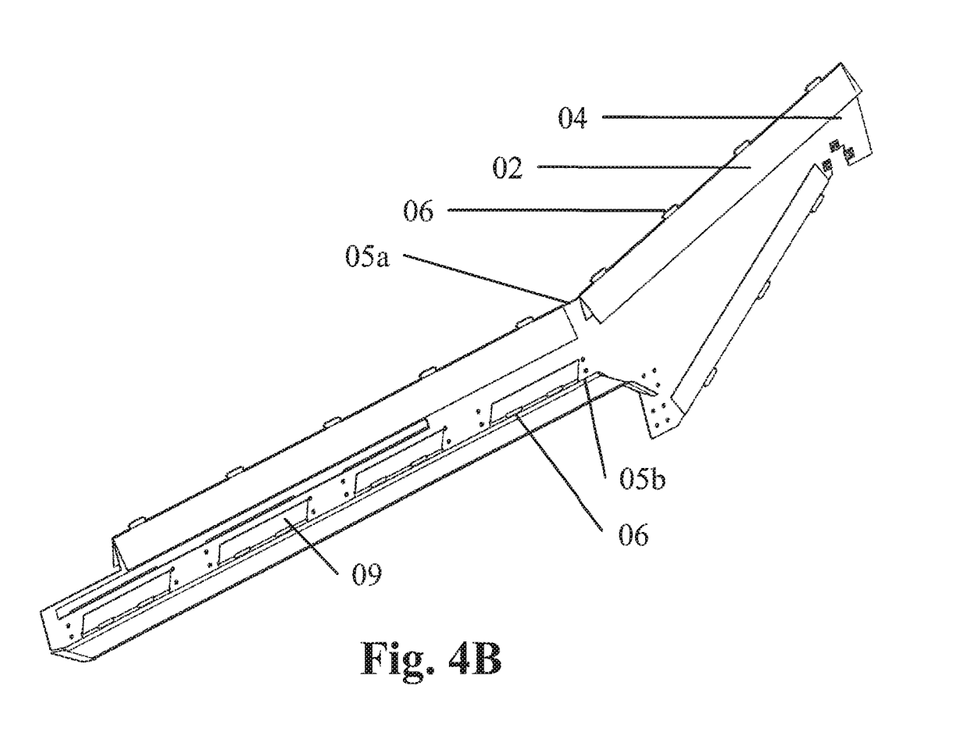
Figure 5A:
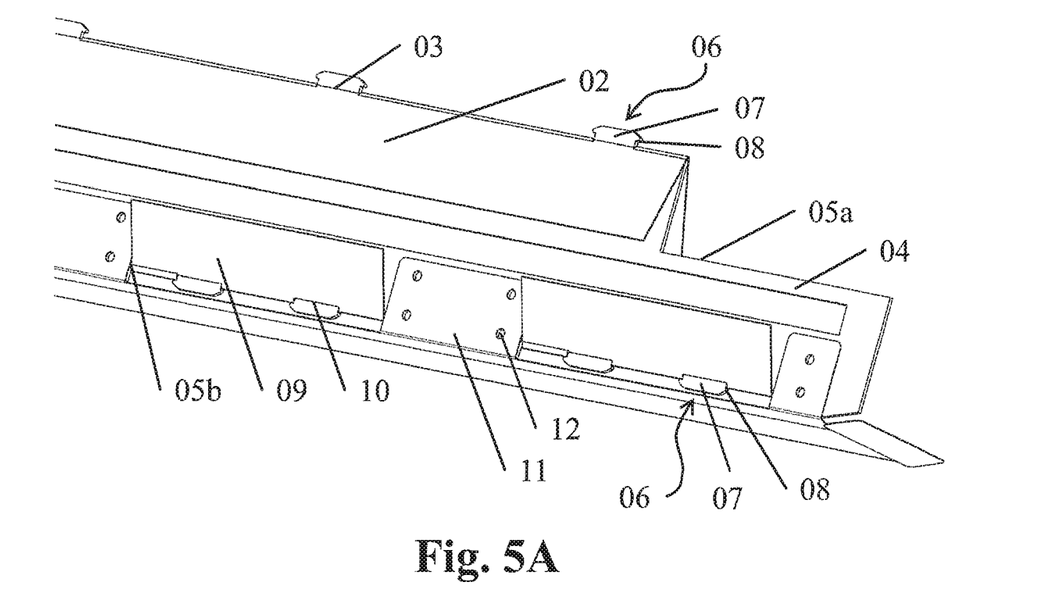
FIG. 5 illustrates an isometric view of a protective cover segment according to the invention having a snapped-in protective cover element and a snapped-in barrier in detail.

In FIG. 3, FIG. 4 and FIG. 5, isometric views of a preferred protective cover segment 11, which is connected to a frame element 04, are illustrated from both sides. It can be clearly seen in FIGS. 3A, 4A and 5A that the frame element 04 and the protective cover segment 11 are realized in multiple pieces. For the connection of these parts, in particular for a rivet connection, rivet holes 12 are provided.

Moreover, in FIGS. 3A, 3B and FIGS. 4A and 4B, it can be clearly seen that the frame element 04 has several fastening means 06, which are formed congruent with each other, in the area of a first longitudinal edge 05a and a second longitudinal edge 05b opposite the first longitudinal edge 05a.

Figure 5B:
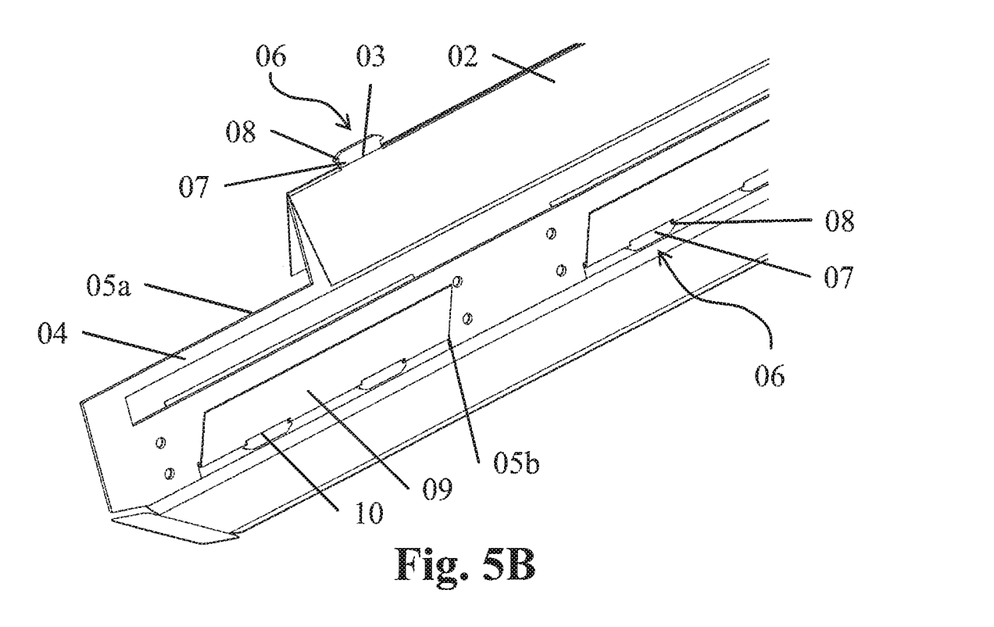

In FIGS. 4A, 4B and FIGS. 5A and 5B, it can be clearly seen that a protective cover element 02 is connected to the frame element 04 by the fastening means 06 of the frame element 04, which are disposed in the area of its first longitudinal edge 05a, being snapped into the holding means 03 of the protective cover element 02. In addition, a ribbon-shaped or strip-shaped barrier 09 is connected to the frame element 04, said ribbon-shaped or strip-shaped barrier first being threaded through the corresponding openings of the frame element 04. Subsequently, the fastening means 06 of the frame element 04, which are disposed in the area of its second longitudinal edge 05b, are snapped into the holding means 10 of the barrier 09. For this purpose, the fastening means 06, as can be clearly seen in FIGS. 5A and 5B, are in the shape of a T having a crosspiece 07 and two projecting T-legs 08. Moreover, the fastening means 06 of the first longitudinal edge 05a and the second longitudinal edge 05b of the frame element 04 are formed congruent with each other, just as the holding means 03, 10 of the protective cover element 02 and the barrier 09.

Figure 6:
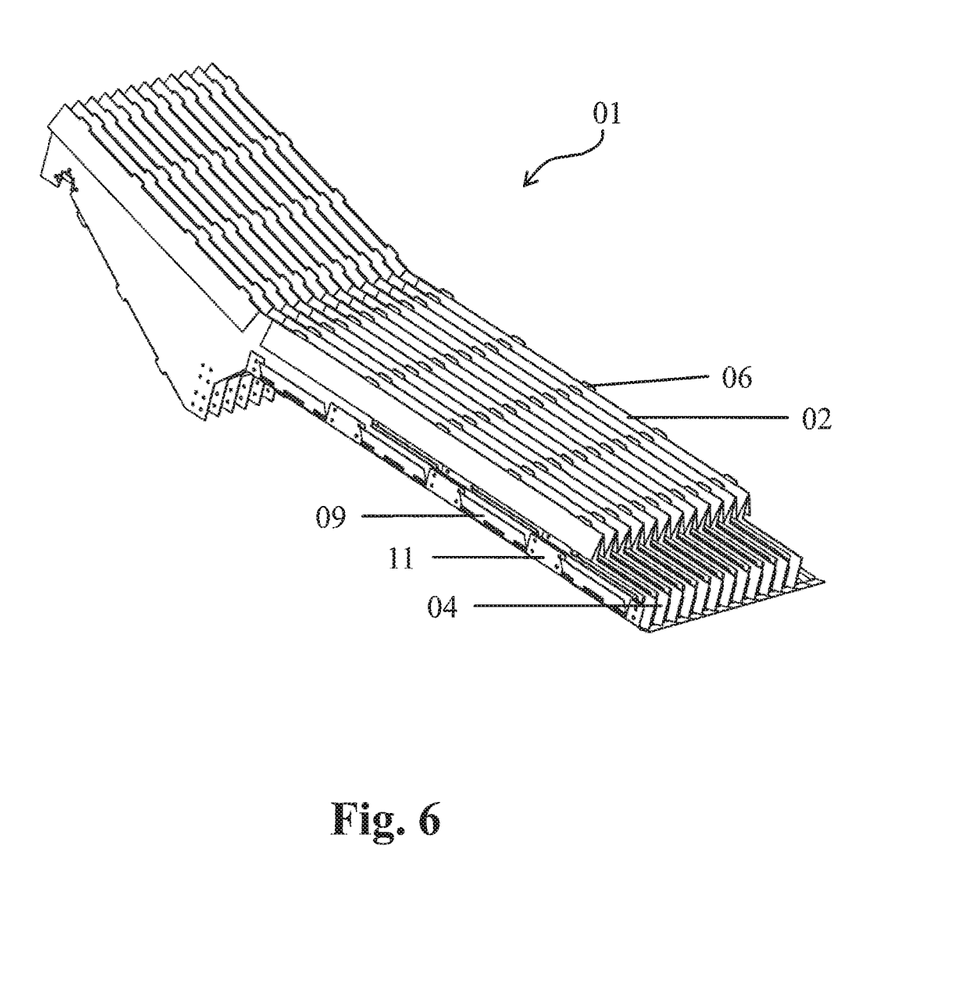
FIG. 6 illustrates an isometric view of a protective cover according to the invention having protective cover segments.

In FIG. 6 an isometric view of a protective cover 01 according to the invention having several protective cover segments 11 as an already mounted roof group is illustrated, e.g. in the make of a bellows. In this context, the frame elements 04 constitute part of a, in particular metal, protective cover segment 11 and are disposed in each fold of a protective cover element 02. The frame elements 04 are connected to the folds of the protective cover element 02 by the fastening means 06 of the first longitudinal edge of the frame element 04 being snapped into the holding means of the protective cover element 02. Additionally, a ribbon-shaped or strip-shaped barrier 09 is connected to the frame element 04 by the fastening means 06 of the frame element 04, which are disposed in the area of its second longitudinal edge, being snapped into the holding means of the barrier 09. Owing to this, the holding means and the fastening means 06 are directly contacted and thus connected to each other.

The invention claimed is:

1. A protective cover comprising at least one protective cover element and comprising a frame element which can be connected to the protective cover element, wherein the protective cover element comprises at least one holding element and the frame element comprises at least one fastening element of extending directly from a first longitudinal edge of the frame element, a connection between the holding element and the fastening element being a detachable snap connection.

2. The protective cover according to claim 1, wherein the holding element is an oblong opening and in that the fastening element is realized in the shape of a T having a crosspiece and two projecting T-legs.

3. The protective cover according to claim 1, wherein the protective cover comprises at least two frame elements and at least one ribbon-shaped or strip-shaped barrier, said barrier being fastened to the first longitudinal edges of the frame elements in the area of said first longitudinal edges of the frame elements by essentially overlapping the entire length of the protective cover, the length of the barrier between every two adjacent frame elements being at least slightly smaller than the maximal length of the protective cover element between said frame elements when the protective cover is extended.

4. The protective cover according to claim 1, wherein the protective cover comprises at least two frame elements and at least one ribbon-shaped or strip-shaped barrier which essentially overlaps the entire length of the protective cover, said barrier comprising at least one holding element and said frame elements each comprising at least one fastening element in the area of second longitudinal edges opposite the first longitudinal edges, said holding element being capable of being connected to the fastening element with a detachable snap connection, and the length of the barrier between every two adjacent frame elements being at least slightly smaller than the maximal length of the protective cover element between said frame elements when the protective cover is extended.

5. The protective cover according to claim 4, wherein the at least one holding element is an oblong opening.

6. The protective cover according to claim 1, wherein the connection can be carried out without using tools.

7. The protective cover according to claim 1, wherein the protective cover has at least two frame elements, said frame elements each constituting part of a protective cover segment, said protective cover segments each engaging behind one another telescopically when the protective cover is being extended.

8. The protective cover according to claim 7, wherein the protective cover segment is metal.

9. The protective cover according to claim 1, wherein the protective cover element and/or a barrier are made of a foldable plastic material.

10. The protective cover according to claim 9, wherein the foldable plastic material is a textile and/or an inherently rigid plastic material.

11. The protective cover according to claim 9,
wherein the plastic material is a thermoplastic material.

12. The protective cover according to claim 1, wherein
the frame element is made of an inherently rigid plastic material.

13. The protective cover according to claim 1, wherein
the frame element connects at least two protective cover elements to each other.

14. The protective cover according to claim 13, wherein the protective cover elements are disposed at an angled offset to each other.

15. The protective cover according to claim 1, wherein the detachable snap connection comprises a force-fitting and/or an interlocking connection.

* * * * *

UNITED STATES PATENT AND TRADEMARK OFFICE
CERTIFICATE OF CORRECTION

PATENT NO. : 10,753,537 B2
APPLICATION NO. : 16/310211
DATED : August 25, 2020
INVENTOR(S) : Maximillian Rochnert et al.

It is certified that error appears in the above-identified patent and that said Letters Patent is hereby corrected as shown below:

In the Claims

Column 8, Claim 1, Line 22, "element of extending" should be --element extending--.

Signed and Sealed this
Fifth Day of January, 2021

Andrei Iancu
*Director of the United States Patent and Trademark Office*